(12) United States Patent
Hong et al.

(10) Patent No.: US 10,104,024 B2
(45) Date of Patent: Oct. 16, 2018

(54) APPARATUS, METHOD, AND COMPUTER PROGRAM FOR PROVIDING USER REVIEWS

(71) Applicant: NAVER CORPORATION, Seongnam-si (KR)

(72) Inventors: Jina Hong, Seongnam-si (KR); Sun Hwa Jung, Seongnam-si (KR); U Jae Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 166 days.

(21) Appl. No.: 15/151,785

(22) Filed: May 11, 2016

(65) Prior Publication Data
US 2016/0337275 A1 Nov. 17, 2016

(30) Foreign Application Priority Data

May 12, 2015 (KR) ........................ 10-2015-0066241

(51) Int. Cl.
*H04L 12/58* (2006.01)
*H04L 29/08* (2006.01)

(52) U.S. Cl.
CPC ............ *H04L 51/046* (2013.01); *H04L 51/20* (2013.01); *H04L 67/02* (2013.01); *H04L 67/18* (2013.01)

(58) Field of Classification Search
CPC ..................................................... H04L 51/046
USPC ....................................................... 709/206
See application file for complete search history.

(56) References Cited

U.S. PATENT DOCUMENTS 8,155,885 B2 * 4/2012 Kwon ..................... G01C 21/00
701/454
2007/0281689 A1 * 12/2007 Altman .............. G06Q 30/0207
455/435.1

FOREIGN PATENT DOCUMENTS

| JP | 2007-328469 A | 12/2007 |
| JP | 2014-209368 A | 11/2014 |
| KR | 10-2014-0062683 | 5/2014 |

OTHER PUBLICATIONS

Office Action issued in corresponding Japanese Patent Application No. 2016-093411, dated Jun. 20, 2017.
Korean Office Action issued in corresponding Korean Patent App. No. 10-2015-0066241, dated Apr. 21, 2016.

* cited by examiner

*Primary Examiner* — Adnan Mirza
(74) *Attorney, Agent, or Firm* — Greer Burns & Crain Ltd.

(57) ABSTRACT

A method, performed by a user review providing system, of providing user reviews includes acquiring, from a first user terminal, location information specifying an area on a map, and providing review posts to the first user terminal by classifying the review posts according to points-of-interest (POIs), the review posts being written by a plurality of users to include information about a POI included in an area specified by the location information and posted on a personal webpage of a writer.

11 Claims, 14 Drawing Sheets

APPARATUS, METHOD, AND COMPUTER PROGRAM FOR PROVIDING USER REVIEWS

CROSS-REFERENCE TO RELATED APPLICATION

This application claims the benefit of Korean Patent Application No. 10-2015-0066241, filed on May 12, 2015, in the Korean Intellectual Property Office, the disclosure of which is incorporated herein in its entirety by reference.

BACKGROUND

1. Field

One or more embodiments of the present invention relate to an apparatus, method, and computer program for providing user reviews.

2. Description of the Related Art

Recently, as distribution and accessibility to a communication network such as the Internet increases, the practice of deciding on the purchase of goods or use of services based on other users' opinions or reviews prior to the purchase or use has become more common. In particular, deciding on a restaurant or cafe to visit by referring to reviews of other users who have visited the place is increasingly popular. As such, since early buyers or users' opinions or reviews are expected to be objective, from a consumer's point of view, compared to business owners or service providers' comments, a consumer's reliability on the reviews is quite high.

Accordingly, an environment which enables simple and convenient searches and access to other users' reviews is needed. Also, a demand for reliable reviews without advertisements or deceptive manipulation is increasing.

SUMMARY

One or more embodiments of the present invention include an apparatus, a method, and a computer program for providing user reviews.

Additional aspects will be set forth in part in the description which follows and, in part, will be apparent from the description.

According to one or more embodiments, a method, performed by a user review providing system, of providing user reviews includes acquiring, from a first user terminal, location information specifying an area on a map, and providing review posts to the first user terminal by classifying the review posts according to points-of-interest (POIs), the review posts being written by a plurality of users to include information about a POI included in an area specified by the location information and posted on a personal webpage of a writer.

A review post may include any one piece of POI information set by the writer of the review post, among a plurality of POIs stored in a map database (DB) provided by the user review providing system.

The POI information may be a map indicating a location of the POI.

The method may further include, before the acquiring of the location information, receiving, from a second user terminal, a selection of any one of POIs stored in a map DB provided by the user review providing system, providing the second user terminal with information about a selected POI, and receiving, from the second user terminal, identification information of a review post including the information about the selected POI and posted on a personal webpage of a second user, and storing the identification information of the review post in the map DB linked with the selected POI, in which, in the providing of the review posts to the first user terminal, the review posts are provided by being classified according to the POIs, the review posts corresponding to review post identification information stored in the map DB linked with the POI included in the area specified by the location information and posted on the personal webpage of the writer.

In the providing of the review posts to the first user terminal, a plurality of POIs included in the area on a map may be listed according to a preset standard, and a webpage in which review posts including each of the plurality of POIs may be listed under each POI is provided to the first user.

The plurality of POIs may be listed in a first direction, and a review post including information about each of the plurality of POIs may be listed in a second direction perpendicular to the first direction.

The preset standard may be that a POI is listed higher as the number of users writing review posts including information of the POI increases.

The POI included in the area of the map may be a POI included in the area on the map among the POIs stored in the map DB provided by the user review providing system.

The location information may include a current location and a range of an area of coverage of the first user terminal, and the range may be set to be a radius set by the first user terminal or a default radius.

In the providing of the review posts to the first user terminal, the number of POIs selected may be as many as a preset number in the order of the largest number of review posts or the largest number of users writing review posts, among the POIs stored in the map DB provided by the user review providing system and included in the area on the map, and review posts written to include information about any one of the selected POIs may be classified according to each POI and the classified review posts may be provided to the first user terminal.

According to one or more embodiments, an apparatus for providing user reviews includes a review writing manager receiving, from a second user terminal, a selection of any one of points-of-interest (POIs) stored in a map database (DB), providing the second user terminal with information about a selected POI, receiving, from the second user terminal, identification information of a review post including the information about the selected POI and posted on a personal webpage of a second user, and storing the identification information of the review post in the map DB linked with the selected POI, and a review provider acquiring, from a first user terminal, location information specifying an area on a map, classifying review posts according to the POIs, the review posts corresponding to review post identification information stored in the map DB linked with the POI included in the area specified by the location information, and providing the classified review posts to the first user terminal.

According to one or more embodiments, there is provided a non-transitory computer readable storage medium having stored thereon a program, which when executed by a computer, performs the methods of providing user reviews described above.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
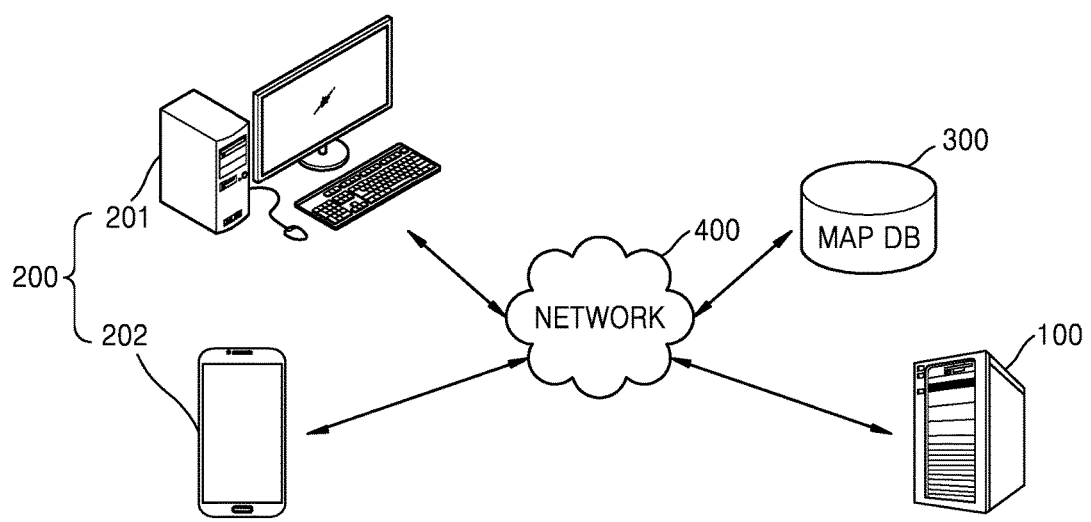
FIG. 1 illustrates a configuration of a system for providing a user review service according to an embodiment.

Reference will now be made in detail to the embodiments of the present invention, examples of which are illustrated in the accompanying drawings, wherein like reference numerals refer to like elements throughout and redundant descriptions thereof are omitted. In this regard, the present embodiments may have different forms and should not be construed as being limited to the descriptions set forth herein. Accordingly, the embodiments are merely described below, by referring to the figures, to explain aspects of the present description.

As the inventive concept allows for various changes and numerous embodiments, embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope of the present inventive concept are encompassed in the present inventive concept. In the description of the present inventive concept, certain detailed explanations of the related art are omitted when it is deemed that they may unnecessarily obscure the essence of the inventive concept.

While such terms as "first," "second," etc., may be used to describe various components, such components must not be limited to the above terms. The above terms are used only to distinguish one component from another. The terms used in the present specification are merely used to describe embodiments, and are not intended to limit the present inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Sizes of components in the drawings may be exaggerated for convenience of explanation. In other words, since sizes and thicknesses of components in the drawings are arbitrarily illustrated for convenience of explanation, the following embodiments are not limited thereto.

FIG. 1 illustrates a configuration of a system for providing a user review service according to an embodiment.

Referring to FIG. 1, a system 10 for providing a user review service according to an embodiment may include a user terminal 200, a server 100, a map database (DB) 300, and a network 400 connected the above constituent elements.

The system 10 for providing a user review service according to the present embodiment provides a user review service, in detail, a review writing service for a user to write a review of a particular point-of-interest (POI) on a personal webpage and a review providing service of collecting and providing other users' reviews on a POI included in a particular location. These two services may be integrally provided by the server 100 as illustrated in FIG. 1, but the present disclosure is not limited thereto. The two services may be provided by separate servers. The POI signifies a point of interest such as a location of a building or store on an electronic map.

A review signifies a review post written by a user who has joined the system 10 for providing a user review service according to the present embodiment. A review post may be posted on a personal webpage, for example, a personal blog, of a user who wrote the review post. When a user writes a review post, the user may select any one of a plurality of POIs stored in the map DB 300 and write a review on the selected POI. A blog is a website on which a blog user freely posts an article according to one's interest. The review post may include review contents such as text, images, and moving pictures input by a user, and information about a POI selected by the user. The POI information may include a name, an address, a telephone number, a map, etc.

For the review writing service provided according to the present embodiment, when POI selection information is transmitted from the user terminal 200 to the server 100, the server 100 provides POI information so that the user may include information about a selected POI in a review post written by the user and store identification information, for example, an address or a link, of a written review post, including the POI information. The identification information of a review post may be stored to be linked with the POI information stored in the map DB 300.

For the review providing service provided according to the present embodiment, when location information generated by the user terminal 200 is transmitted to the server 100, the server 100 for providing user reviews specifies an area on a map by using the location information and provides other users' reviews related to a POI included in the area to the user terminal 200.

In the following description, the system 10 for providing a user review service according to an embodiment provides a user with POI information and stores identification information about a review post written including the POI information (first embodiment), and acquires location information from the user and provides the user with review posts written by other users about the POI included in an area specified by the acquired location information (second embodiment).

Referring to FIG. 1, the user terminal 200 is a communication terminal capable of using a web service in a wired and wireless communication environment. The user terminal 200 may be a user's personal computer 201 or a user's portable terminal 202. Although FIG. 1 illustrates that the portable terminal 202 is a smart phone, the present disclosure is not limited thereto and, as described above, a terminal provided with an application capable of web browsing may be employed without limitation.

The user terminal 200 may include a display portion displaying an image and an input device receiving an input of data from a user. The input device may include, for example, a keyboard, a mouse, a trackball, a microphone, a button, or a touch panel, but the present disclosure is not limited thereto.

The map DB 300 stores geographical information implemented by software by digitally converting a paper map. The map DB 300 may store information about a plurality of POIs. The POI information may be stored in a table. A record corresponding to each POI may be stored in the table. The table includes items such as the name of a POI, an address, a telephone number, a map, and a rough map, or identification information about at least one review post on the POI. As the map DB 300 stores the identification information about a review post that is selected directly from the map DB and written by the user, for each POI, review posits having high reliability for each POI may be secured.

The network 400 connects the user terminal 200, the server 100, and the map DB 300. For example, the network 400 provides a connection path through which the user terminal 200 may access the server 100 and then transmit and receive packet data. Furthermore, the network 400 provides a connection path so that the server 100 may access the map DB 300 to read data or correct or update data stored in the map DB 300.

Although not illustrated in the drawings, the server 100 according to an embodiment may include a memory, an input/output portion, a program storing portion, a controller, etc.

Figure 2:
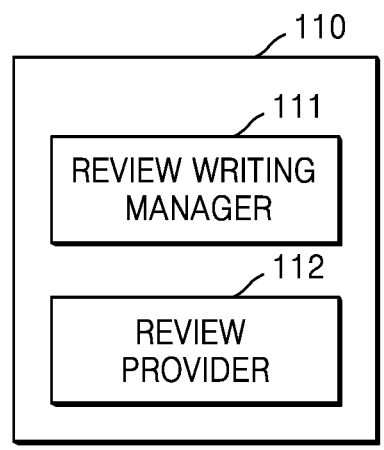
FIG. 2 is a block diagram of an apparatus for providing user reviews according to an embodiment.

FIG. 2 is a block diagram of an apparatus 110 for providing user reviews according to an embodiment.

The apparatus 110 for providing user reviews according to the present embodiment may correspond to at least one processor or include at least one processor. Accordingly, the apparatus 110 for providing user reviews may be driven in a form of being included in other hardware such as a microprocessor or a general-purpose computer system. The apparatus 110 for providing user reviews may be a component or element of the server 100, or it may be a stand-alone device in communication with the server 100.

FIG. 2 illustrates only constituent elements related to the present embodiment in the apparatus 110 for providing user reviews in order to focus on the technical characteristics of the present embodiment. Accordingly, it is understandable for those of ordinary skill in the art to which the present inventive concept pertains that general-purpose constituent elements other than the constituent elements illustrated in FIG. 2 may be further included in the apparatus 110 for providing user reviews.

Referring to FIG. 2, the apparatus 110 for providing user reviews according to the present embodiment includes a review writing manager 111 and a review provider 112. The review writing manager 111 and a review provider 112 are functions or operations performed by the apparatus 110 for providing user reviews. The functions or operations of the review writing manager 111 and a review provider 112 may each be realized through dedicated hardware portion of the apparatus 110, or they may be implemented as code or instructions stored separately from or within the apparatus 110, and executed by the apparatus 110. The apparatus 110 for providing user reviews may provide a plurality of users with services according to the present embodiment.

In the following description, a first user denotes a user who searches for a review and a second user denotes a user who writes a review. However, the separate calling of the first user and the second user is merely for identifying an object to receive a service provided by the apparatus 110 for providing user reviews, in view of the apparatus 110 for providing user reviews. Actually, the first user and the second user may be the same user or different users.

The review writing manager 111 according to the present embodiment provides an interface so that the second user writes a review post. The review writing manager 111 provides an environment of searching a POI stored in the map DB 300 when the second user writes a review post and receives any one of the POIs stored in the map DB 300 selected by the second user. Assuming that the second user selects a first POI, the review writing manager 111 provides information about the first POI to a second user's terminal so that the information about the first POI selected by the second user may be inserted in the review post. The second user posts the review post including the information about the first POI on a second user's personal webpage. The information about a POI included in a review post may include the name of the POI, the address, the telephone number, and the homepage, or a map indicating the location of the POI.

The review writing manager 111 receives from the second user's terminal the identification information of a written review post including the information about the first POI.

The review writing manager 111 stores the identification information of the review post received from the user terminal 200 in the map DB 300, to be interlined with the first POI. A table including the information about a POI may be stored in the map DB 300. The table may include the name of a POI, the address, and the telephone number, or identification information of a review post. Identification information of a plurality of review posts for a single POI may be stored in the map DB 300.

The review provider 112 according to the present embodiment provides review posts written by other users regarding a POI existing in an area desired by the first user. The other users signify users who wrote review posts, not excluding the first user. In other words, a review post written by the first user may also be provided to the first user.

The review provider 112 acquires location information specifying an area on a map from a first user's terminal. The location information may include the current location and a range of an area of coverage of the first user's terminal, and the range may be directly set by the first user's terminal or a preset default radius. Although the current location of the first user's terminal may be received from a GPS apparatus provided in the first user's terminal, the present disclosure is not limited thereto. Although the first user may transmit location information to the review provider 112 based on the current location of a terminal, the present disclosure is not limited thereto and the first user may directly set a desired location and transmits information about the location to the review provider 112.

The review provider 112 provides a review post on a POI included in the area on a map specified by the location information to the first user terminal. The review post provided by the review provider 112 is a review post written by each user to include the information of a POI included in the area on a map and posted on a personal webpage of each user.

The POI included in the area on a map signifies a POI included in the area on a map among the POIs stored in the map DB 300 provided by user review providing system 10. The POI included in the area on a map may be plural, and the review provider 112 may classify the review posts according to POIs and provide classified review posts to the first user's terminal. The review provider 112 may list the POIs included in the area on a map according to a preset standard and provide a web page, in which review posts of each POI are listed below each POI, to the first user's terminal.

When the POIs included in the area on a map are over a certain number, the review provider 112 may select and list POIs as many as the certain number and list review posts on each of the selected POIs under each POI.

The certain number may be preset to be, for example, 10. For example, when the number of the POIs included in the area on a map is twenty, the review provider 112 may select and list ten POIs and then list review posts written to include information about each of the ten selected POIs under each POI.

When selecting a certain number of POIs among a plurality of POIs, the review provider 112 may select a certain number of POIs in the order of popularity. The popularity may be calculated to be high as the number of review posts increases and the number of users writing review posts on the POI increases. In the calculation of popularity, a plurality of review posts written by a single user in a malicious manner are counted as one review post. As such, as the popularity of a POI is calculated based on the review post that a user directly posted on a personal webpage, a reliable popularity value may be calculated without advertisement and deceptive manipulation.

When listing certain number of POIs calculated, the review provider 112 may rank a POI at a higher position in the list as the number of review posts on the POI increases or as the number of users writing review posts on the POI increases.

When providing a webpage, the review provider 112 may display a map indicating an area on a map in the upper end of the webpage and list a plurality of POIs in a first direction under the map and review posts including information about each POI in a second direction different from the first direction. For example, the review provider 112 may list a plurality of POIs from top to bottom under a map and review posts corresponding to each POI from left to right just under a position where each POI is indicated. (See FIG. 8.) A list of the review posts on each POI may be independently scrolled in a horizontal direction.

Figure 3:
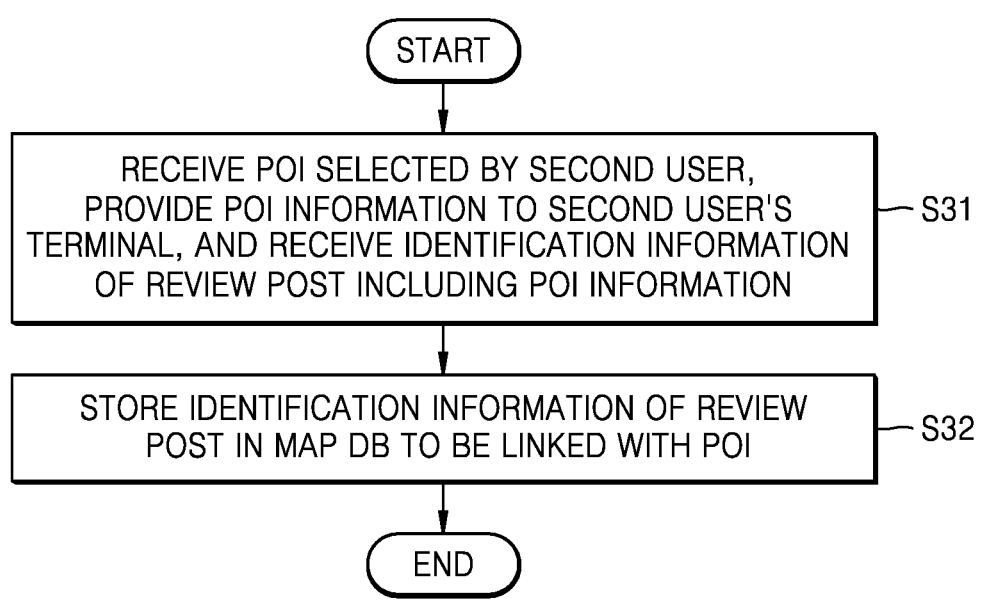
FIG. 3 is a flowchart of a method of providing user reviews according to an embodiment.

FIG. 3 is a flowchart of a method of providing user reviews according to an embodiment.

The flowchart of FIG. 3 includes operations processed time-serially in the review writing manager 111 of FIG. 2. Accordingly, the above descriptions presented related to the constituent elements of FIG. 2, though they are omitted below, may be applied to the flowchart of FIG. 3.

Referring to FIG. 3, in Operation S31, in a process in which a second user writes a review post, the review writing manager 111 receives a POI selected by the second user, provides information about a selected POI to the second user's terminal, and receives from the second user's terminal identification information of a review post written to include information about the selected POI and posted on a personal webpage of the second user.

In Operation S32, the review writing manager 111 stores identification information of the review post received in the operation S31 in the map DB 300 to be linked with the POI.

Figure 4:
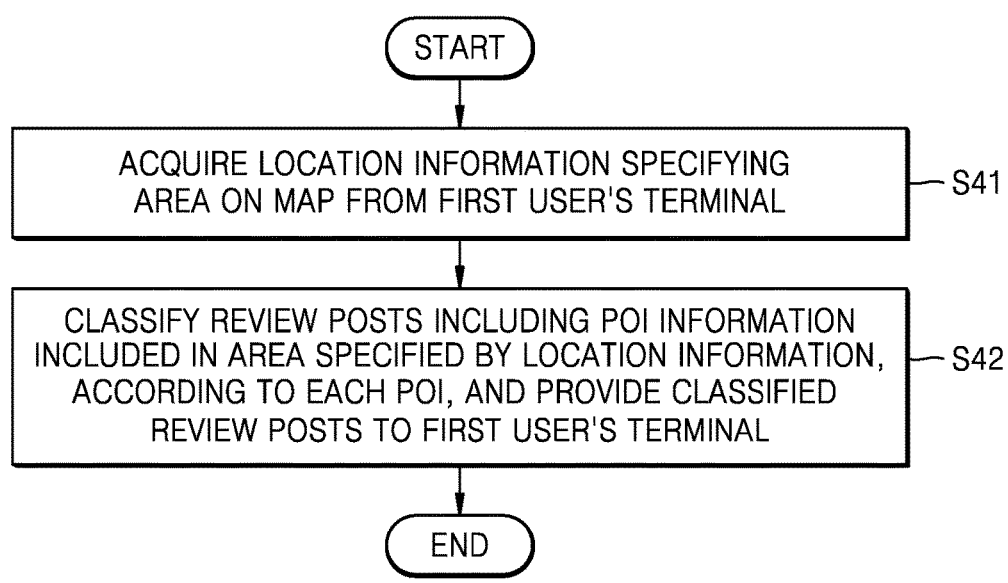
FIG. 4 is a flowchart of a method of providing user reviews according to an embodiment.

FIG. 4 is a flowchart of a method of providing user reviews according to an embodiment.

The flowchart of FIG. 4 includes operations processed time-serially in the review provider 112 of FIG. 2. Accordingly, the above descriptions presented related to the constituent elements of FIG. 2, though they are omitted below, may be applied to the flowchart of FIG. 4. The flowchart of FIG. 4 may be processed afterward by being connected to the operation S32 of FIG. 3.

Referring to FIG. 4, in Operation S41, the review provider 112 acquires location information specifying an area on a map from the first user's terminal.

In Operation S42, the review provider 112 classifies review posts including POI information included in an area specified by the location information acquired in the operation S41, according to each POI, and provides classified review posts to the first user's terminal.

FIGS. 5 to 14 are examples of a screen provided by the apparatus 110 for providing user reviews of FIG. 2 and displayed on the user terminal 200. In the following description, the functions of the apparatus 110 for providing user reviews illustrated in FIG. 2 are described in detail with reference to FIGS. 5 to 14.

Figure 5:
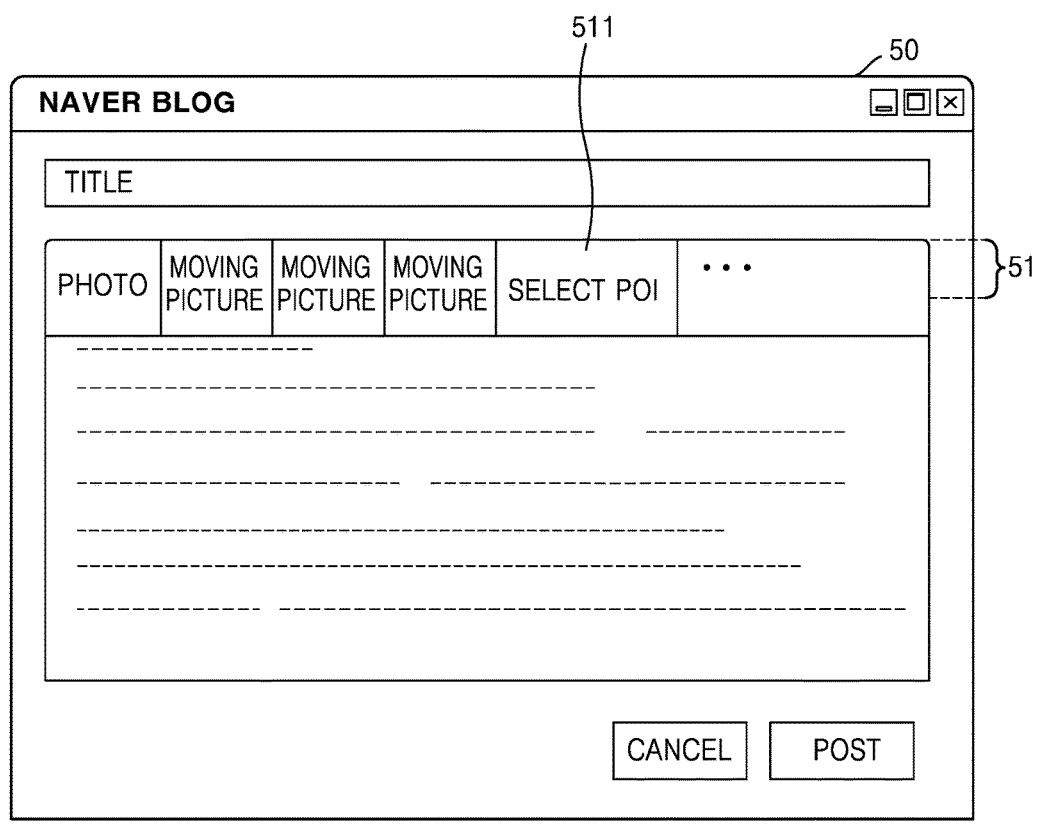
FIGS. 5 to 14 are examples of a screen provided by the apparatus for providing user reviews of FIG. 2 and displayed on a user terminal.
Figure 6:
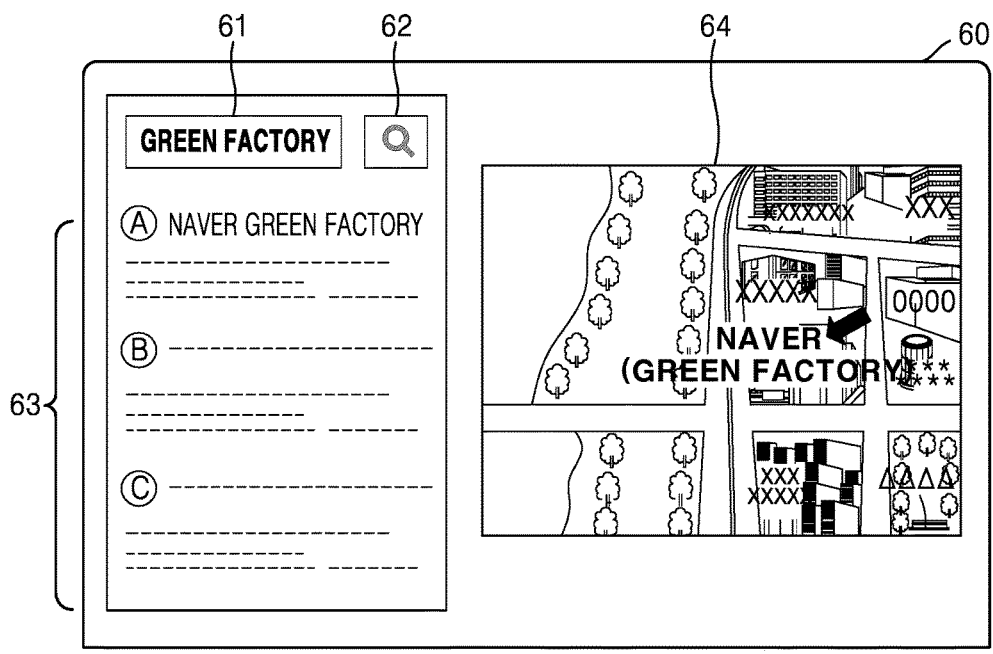
Figure 7:
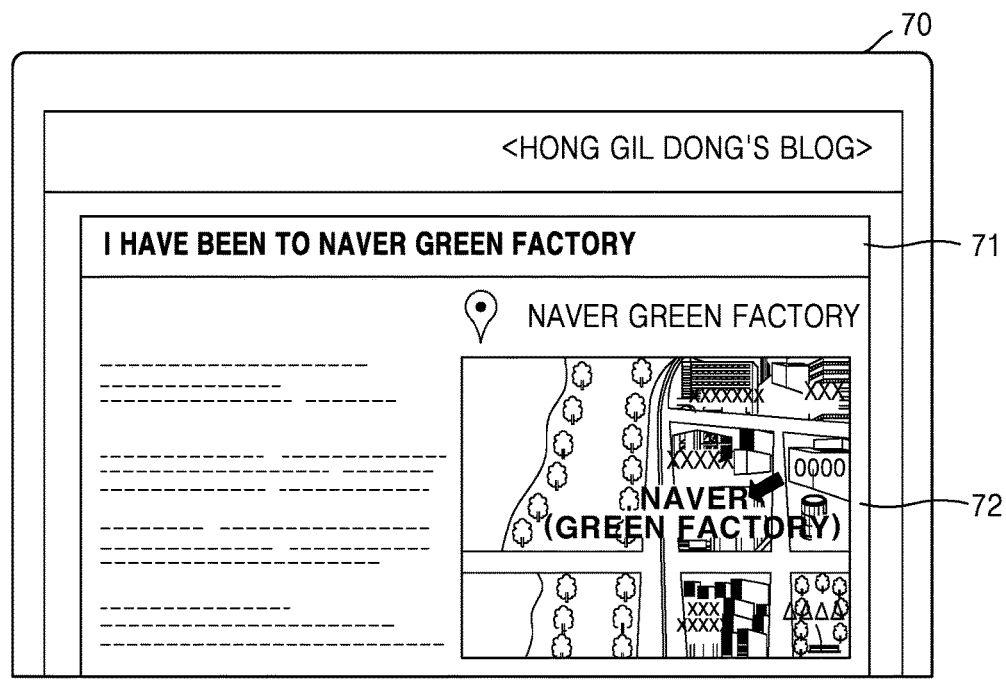

First, FIGS. 5 to 7 are examples of screens provided by the review writing manager 111 on the user terminal 200.

FIG. 5 is an example of a review writing screen.

A screen 50 illustrated in FIG. 5 is a screen on a second user's terminal (one of the user terminals 200) on which the second user writes a review post. Referring to FIG. 5, an area for inputting a title and content of a review post is displayed on the screen 50, and a function menu 51 for inserting items to the content of a review post is provided. The function menu 51 provides a function of inserting items such as a photo, a moving picture, a file, or music, to the review post.

The second user writing a review post may select a POI selection menu 511 among the function menu 51 so that a particular one of the POIs stored in the map DB 300 may be selected.

FIG. 6 is an example of a screen 60 on the second user's terminal for searching for a POI and selecting a searched POI.

In detail, the screen 60 illustrated in FIG. 6 is a screen provided when the POI selection menu 511 of FIG. 5 is selected. Referring to FIG. 6, the screen 60 is provided with a search window 61 in which the second user inputs a keyword to search for a POI. In the example of FIG. 6, the second user inputs a keyword "green factory" in the search window 61.

The second user may transmit the keyword to the review writing manager 111 by pressing a search button 62. The review writing manager 111 provides a search result 63 of the keyword. The search result 63 may include a plurality of POIs corresponding to the keyword. The locations of the POIs included in the search result 63 may be indicated on a map 64 next to the search result 63.

In an example illustrated in FIG. 6, the second user selects any one POI, for example, "A. NAVER GREEN FACTORY", and a pin indicating the location of the POI selected by the second user is displayed on the map 64.

FIG. 7 is a screen 70 provided by a personal webpage of the second user.

In detail, the screen 70 of FIG. 7 is a screen on the second user's terminal displaying a review post 71 generated by the second user through the screens 50 and 60 of FIGS. 5 and 6 and posted on a personal webpage of the second user.

Referring to FIG. 7, the name of the personal webpage of the second user, for example, "HONG GIL DONG'S BLOG" is displayed on the screen 70. The review post 71 is displayed under the name of the personal webpage. Information 72 of a POI the review selected is displayed in the review post. Although the POI information includes only the name and the map, information such as an address or a telephone number may be further provided.

Next, FIGS. 8 to 14 are examples of a screen on the user terminal 200 provided by the review provider 112.

Figure 8:
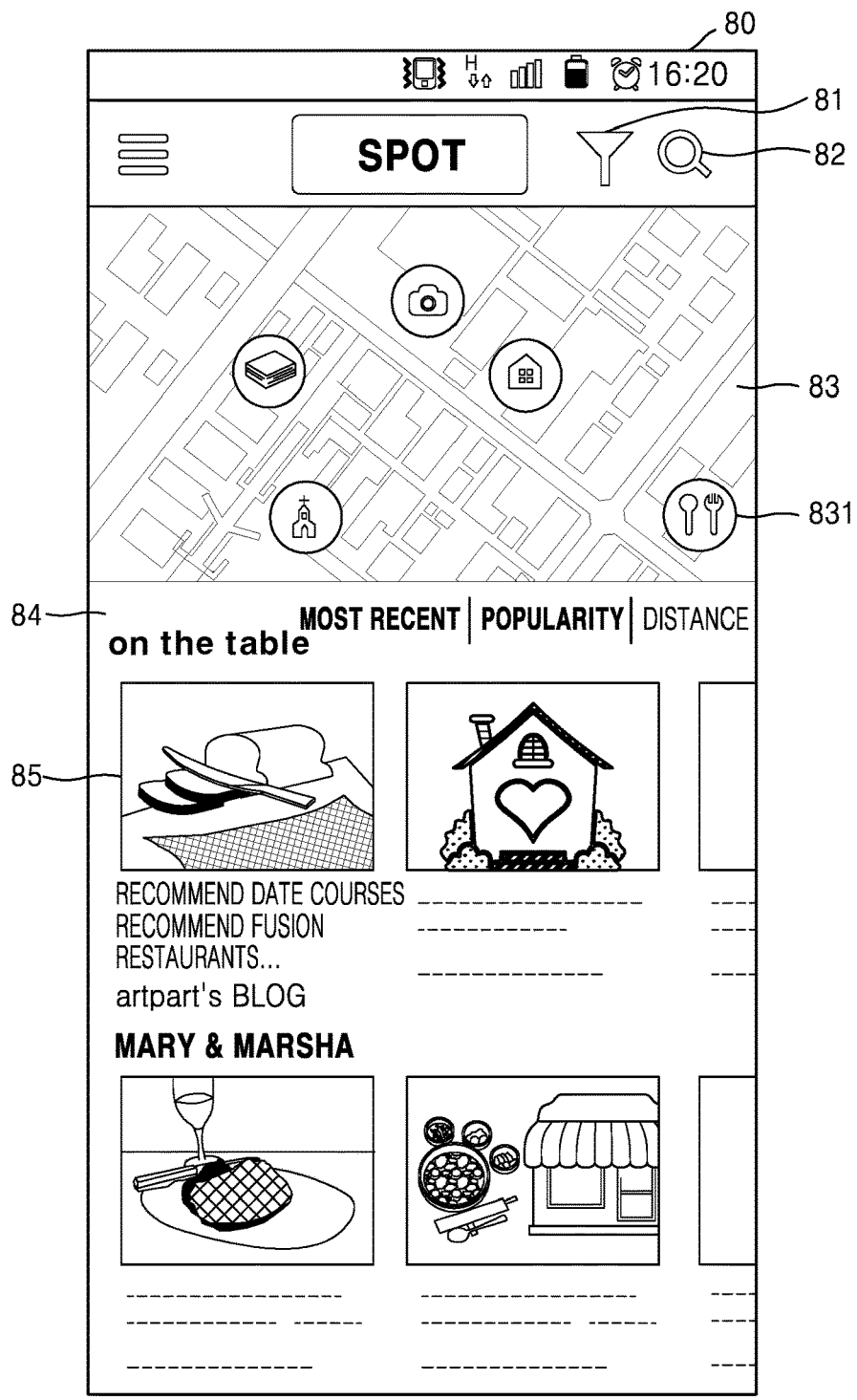

A screen 80 of FIG. 8, as an example of a review providing screen, is an example of a home screen first provided when a user executes a review search program or application to search for reviews, or when the user accesses a review search website.

Referring to FIG. 8, a map 83 is displayed on the screen 80, and pins 831 indicating the locations of POIs included in an area on the map 83 are displayed on the map 83. The review provider 112 may specify the area on a map to an area within a radius of about 500 m based on the current location of the first user's terminal. The first user may specify the area on a map by directly selecting a filter button 81. In the above description, the current location of the first user's terminal may be replaced with a particular location selected by the first user or a default location.

The review provider 112 may select a preset number, for example, ten POIs among the POIs included in the area on a map and display the pin 831 indicating the locations of the selected POIs on the map 83. A method of selecting a preset number of POIs is the same as that presented above.

When the first user performs a zoom-in or zoom-out operation on the map 83, a radius that specifies an area on a map may be adjusted as well. When the first user changes the area indicated on the map 83 by dragging the map 83, the review provider 112 specifies an area on a map again and exposes POIs included in the specified area again.

In the screen 80, the POIs included in the area on the map 83 are listed from top to bottom under the map 83. Review posts corresponding to each POI are listed from left to right under the information of each POI. In detail, the name 84 and category information of a POI are indicated and information 85 of the review posts corresponding to the POI are displayed thereunder. The information 85 of a review post may include, for example, a representative image and the title of a review post, a name of author's personal webpage, a part of a main text, the number of clicks of a "Like" button and replies by other users with respect to a review post.

Although FIG. 8 illustrates only two pieces of the POI information, this is merely due to the limit in the size of a display portion of a user terminal and a user may see more POI information by scrolling the screen down.

In the example of FIG. 8, the POIs are listed from top to bottom in the order of popularity. The popularity of POIs may be calculated to be higher as the number of review posts on a POI increases or the number of "Like" button clicks and replies to a POI increases. Alternatively, the popularity of a POI may be calculated to be higher as the number of review posts registered for last six months or last one year increases. Accordingly, the popularity of a POI received most interest from recent users is calculated to be high.

When the first user selects a portion indicated by "MOST RECENT," on the screen 80, a review post most recently registered and having the earliest writing time is ranked at the top of a POI information section.

Although in FIG. 8 only the order of popularity and most recent as a POI listing condition, other listing conditions may be further displayed. For example, a listing condition by distance may be displayed. When a user selects an order based on distance, the POI information are listed from top to bottom in the order of distance, that is, from the closest to the farthest, based on a current location of the first user terminal.

When the first user selects the particular pin 831 indicated on the map 83, for example, the POI information corresponding to the selected pin 831 may be briefly displayed under the map 83.

The filter button 81 and a search button 82 indicated in the upper end of the screen 80 provide additional functions to a user. First, when the user selects the filter button 81, the user may directly specify an area on a map. When the user selects the search button 82, the user may directly input and search for location information to specify an area on a map.

Figure 9:
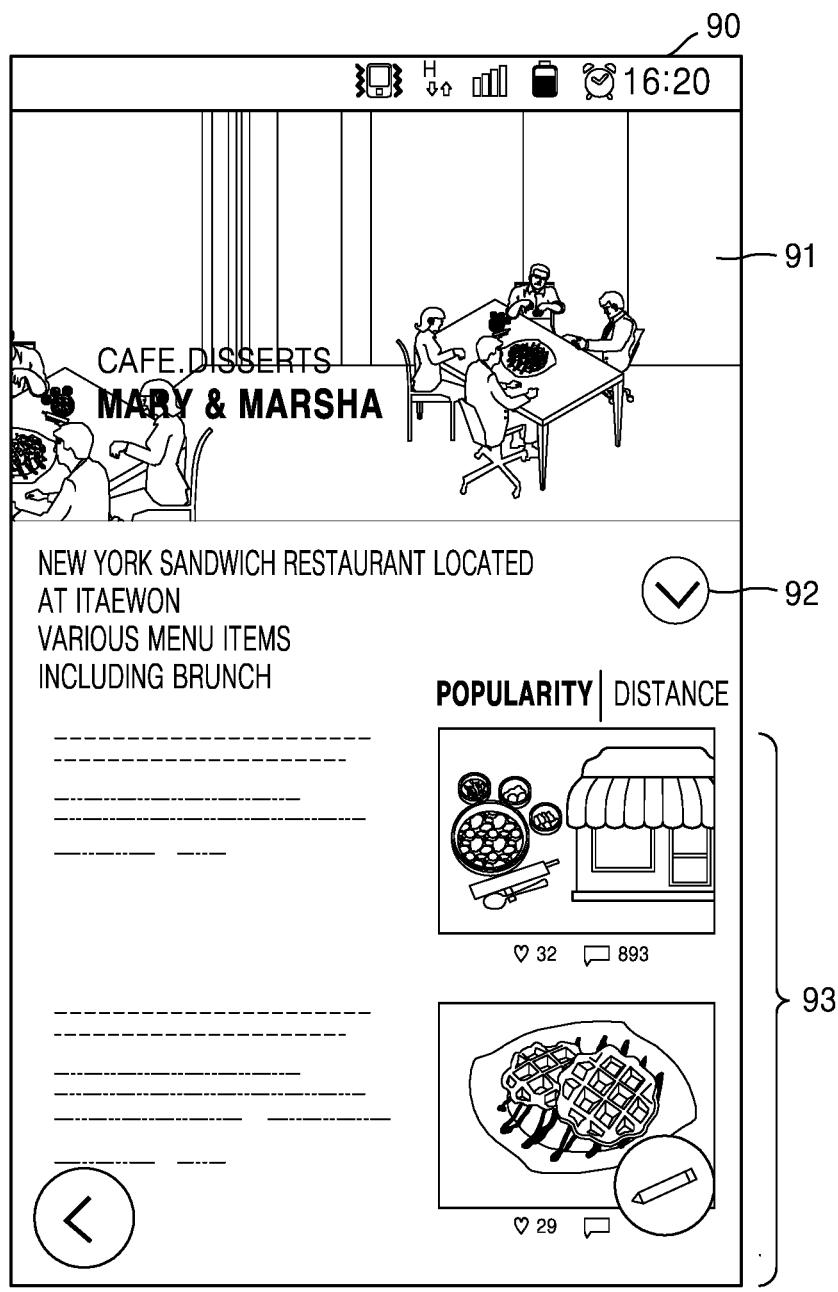

FIG. 9 illustrates an example of a screen 90 providing information of a single POI.

When a name of POI indicated by "MARY & MARSHA" among the POI information listed under the map 83 in FIG. 8 is selected, the screen 80 moves to the screen 90 of FIG. 9. The screen 90 of FIG. 9 provides information about the POI having a name of "MARY & MARSHA".

Referring to FIG. 9, the screen 90 displays POI information 91. Although the POI information 91 is illustrated to include a category of a POI (CAFE.DISSERTS) and a name of a POI (MARY & MARSHA), additional information may be further displayed.

A representative image of a POI may be displayed as a background image of the POI information 91. An example in which a detailed description on a POI is indicated under an image is illustrated. When a user selects an expansion button 92, the area where the description is indicated expands and thus additional information such as a telephone number, an address, and a homepage may be further provided.

A list 93 of review posts written to include the POI information about "MARY & MARSHA" is displayed thereunder.

Figure 10:
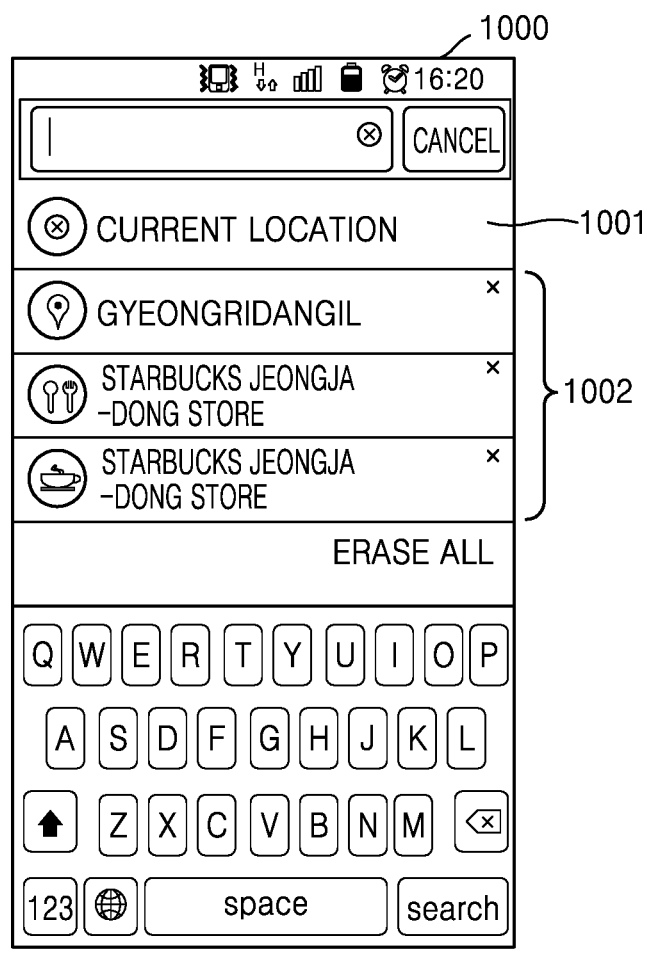

FIG. 10 illustrates an example of a search screen through which a user may directly input location information.

In detail, a screen 1000 of FIG. 10 is a screen provided on the user terminal 200 by the review provider 112 when the search button 82 of FIG. 8 is selected.

The screen 1000 of FIG. 10 is in a state before the user inputs a keyword in a search window. Related keywords to help input a keyword are listed under the search window 61 (see FIG. 6).

As a related keyword, a current location item 1001 and a previous keyword item 1002 that the user has input in the past are displayed. When the user selects the current location item 1001, current location information of the user terminal is acquired from a GPS device provided in the user terminal and the current location information of the user is input as a keyword and transmitted to the server 100.

Alternatively, when the user selects the current location item 1001, a list of POIs included in an area within a certain radius from a current location may be displayed in replacement of the previous keyword item 1002.

When the user selects any one of the previous keyword item 1002, a selected keyword is input and transmitted to the server 100. The user may input location information or a POI name as a keyword. The previous keyword item 1002 that has been input in part may include all of the location information such as "GYEONGRIDANGIL" and POI names such as "STARBUCKS JEONGJA-DONG STORE".

Figure 11:
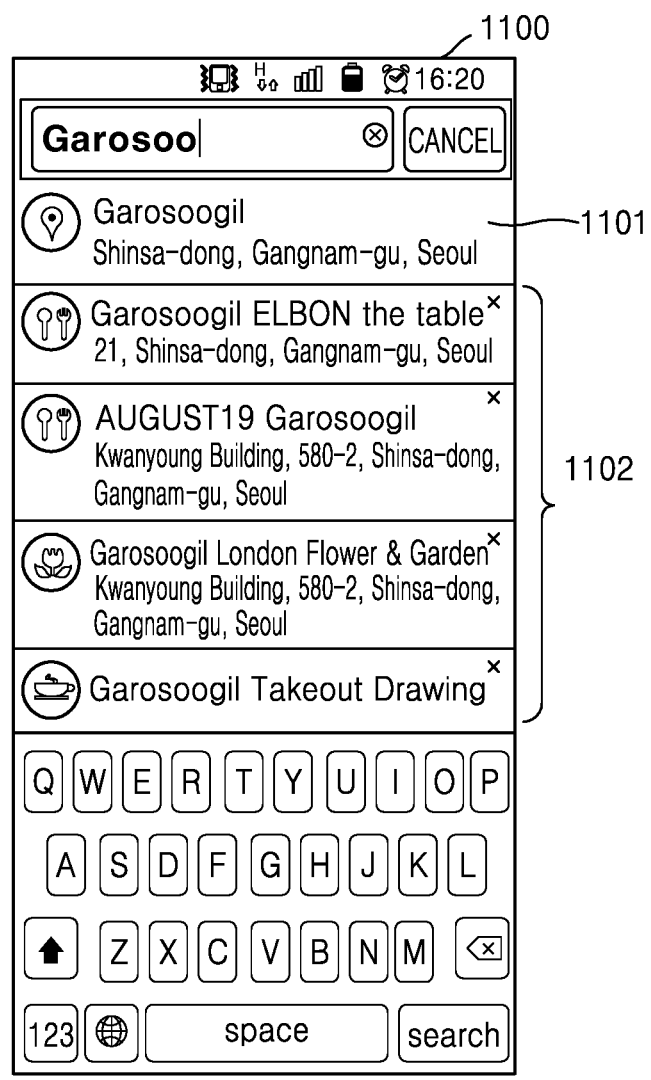

FIG. 11 is an example of a search screen in a state in which a user inputs a keyword.

In detail, a screen 1100 of FIG. 11 is an example of a screen displayed on a user's terminal when the user directly inputs a keyword on the search window of FIG. 10.

Referring to FIG. 11, a keyword "Garosoo" is input to the search window displayed on the screen 1100. The review provider 112 may list related keywords corresponding to "Garosoo" under the search window in real time. Referring to FIG. 11, a location information list 1101 and a POI list 1102 are sequentially listed as the related keywords corresponding to "Garosoo".

The related keyword signifies any keywords having a relation to one another. For example, when the number of consecutively input first keyword and a second keyword by users is over a reference value, the first keyword and the second keyword may be set to be related keywords. For example, when the number of input first location information as a keyword and then selecting a first POI from a POI search result by users is over a reference value, the first location information and the first POI may be set to be related keywords. Alternatively, among POIs corresponding to the first location information, a certain number of POIs in the order of high popularity may be set to be related keywords of the first location information. Alternatively, when a second keyword formed of a part of the first keyword exists, keywords including a word "Garosoo", such as "Garosoogil" or "Garosoogil ELBON the table", may be set to be related keywords of "Garosoo". A method of setting related keywords is not limited to the above descriptions.

When the user selects "Garosoogil" indicated in the location information list 1101, a screen listing POIs in an area on a map corresponding to "Garosoogil" is provided like the screen illustrated in FIG. 8.

When the user selects any one of the POIs indicated on the POI list 1102, a screen with respect to a selected POI is provided like the screen illustrated in FIG. 9.

Figure 12:
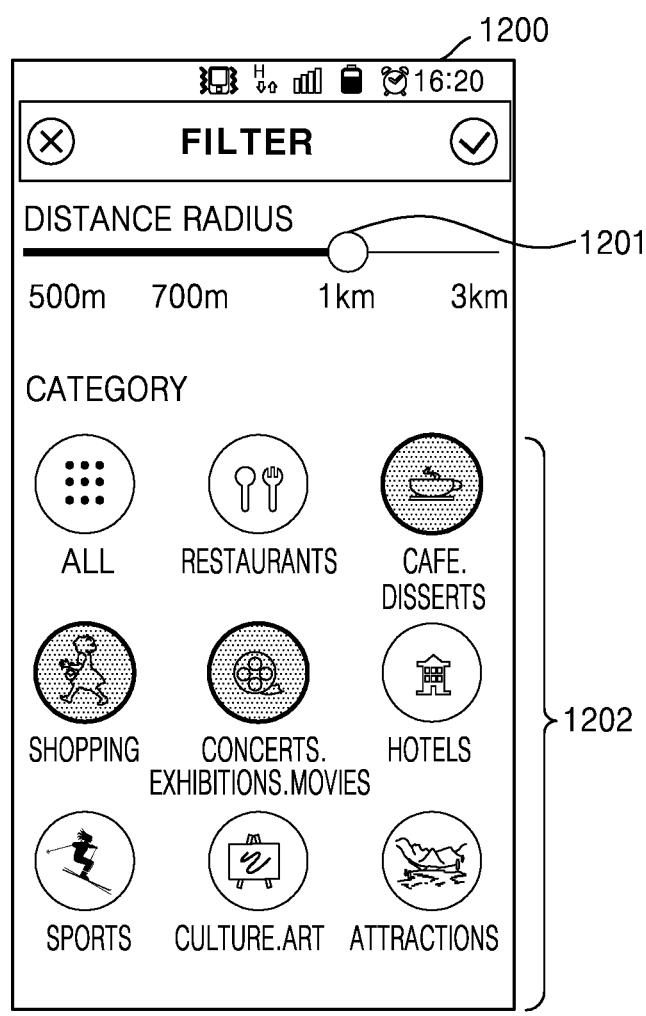

FIG. 12 illustrates an example of a screen 1200 through which the user selects conditions of the location information.

In detail, the screen 1200 of FIG. 12 is a screen provided on the user terminal 200 by the review provider 112 when the user selects the filter button 81 of FIG. 8. The filter signifies a function of setting search conditions by the user to specify an area on a map.

For example, the first user may select a range of distance radius by adjusting the position of a slide bar 1201, and specify categories of POIs that are search targets by selecting desired categories among a plurality of POI categories 1202 so as to have POIs of the selected categories displayed. In FIG. 12, an example in which a distance radius is 1 km and three categories of "CAFE.DISSERTS", "SHOPPING", and "CONCERTS.EXHIBITIONS.MOVIES" are selected is illustrated. In this case, among POIs existing within a radius of 1 km with respect to a current location, a POI corresponding to any one of the three categories of "CAFE.DISSERTS", "SHOPPING", and "CONCERTS.EXHIBITIONS.MOVIES" may be provides as a search result.

Figure 13:
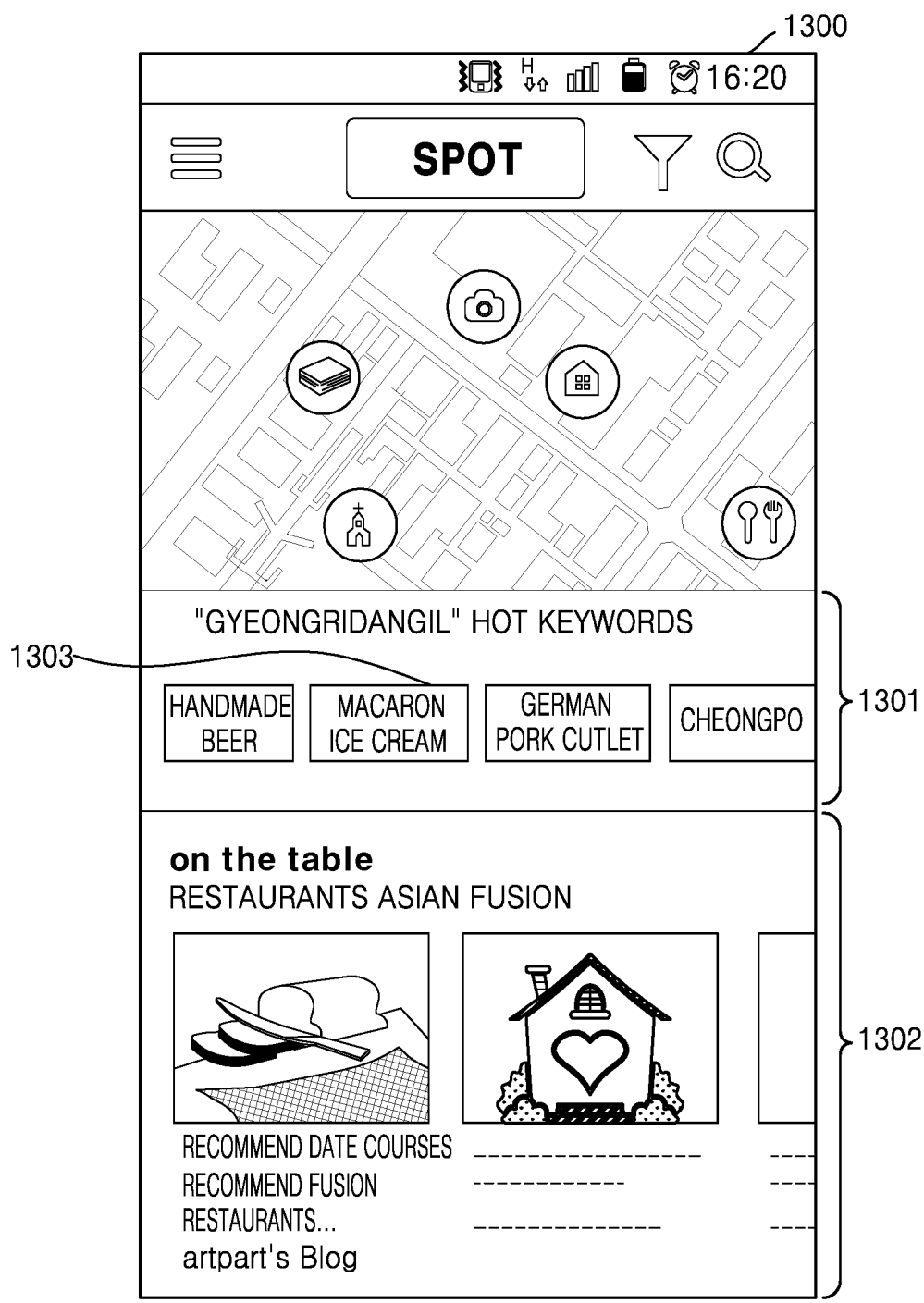

FIG. 13 is an example of a review providing screen.

In detail, FIG. 13 illustrates a screen 1300 on the user terminal 200 that provides reviews on an area of "GYEONGRIDANGIL".

A map displayed on the screen 1300 indicates the "Gyeongridangil" area and locations of POIs included in the area on the map are displayed on the map by pins. The POIs and review posts on the POIs are displayed in a lower region 1302 of the screen 1300. A "hot keywords" list 1301 related to "GYEONGRIDANGIL" that is the area on the map is displayed just under the map.

A hot keyword is a sort of a related keyword and, in particular, signifies a keyword with respect to which interest is increasing in real time. The review provider 112 may set hot keywords in the same method as the above-described method of setting related keywords. The review provider 112 may set keywords that are related keywords and also have a search rate rapidly increasing in real time, as hot keywords. For example, the review provider 112 may set keywords simultaneously satisfying a condition of being a related keyword with respect to "Gyeongridangil" and a condition of being a real-time keyword, as hot keywords.

The related keyword may be set according to the above-described conditions, but the present disclosure is not limited thereto. For example, keywords input together when the user searches for location information, keywords about the name of an area corresponding to the area displayed on a map, keywords input by the user when searching for POIs in the area display on a map, or the name of a POI having a recently increasing review posts among the POIs in the area displayed on a map can be the related keywords. Among the above related keywords, a keyword having the number of inputs exceeding a reference value or rapidly increasing within a preset recent period may be selected as a hot keyword.

The real-time keyword may be, for example, a keyword having the number of inputs by users rapidly increasing within a preset recent period, compared to the number of inputs in the past. However, a target designated by a real-time keyword is not necessarily limited to a keyword that the user directly inputs. For example, a keyword may satisfy the condition of a real-time keyword when the number of times that it is referred to by users in review posts within a preset recent period rapidly increases compared to the number of times that it was referred to in the past, and thus, the keyword may be set to be a hot keyword.

When there is no hot keyword corresponding to an area displayed on a map, no hot keyword is displayed on the screen 1300.

Figure 14:
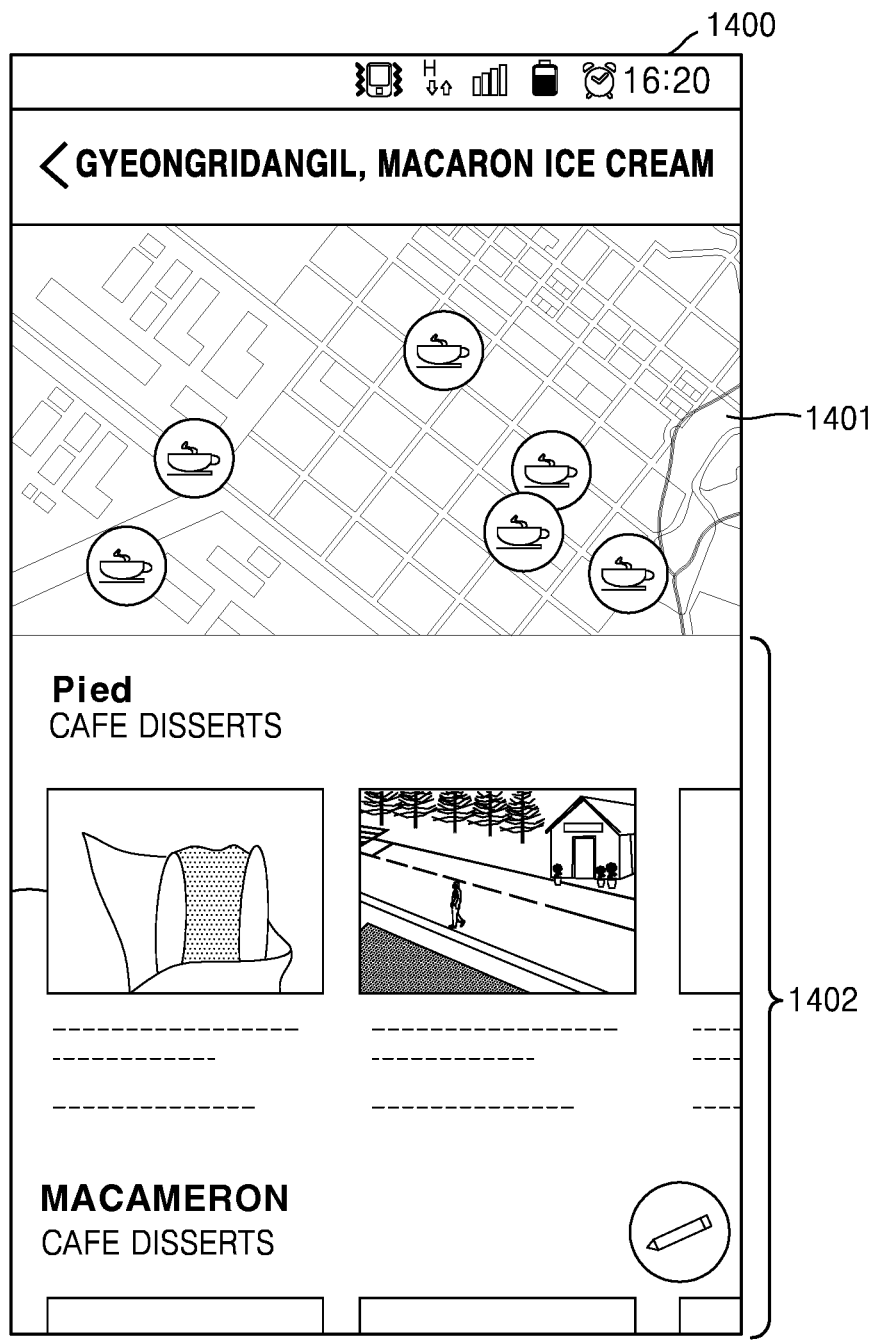

FIG. 14 illustrates an example of a screen 1400 on a user terminal 200 provided when a hot keyword is selected.

In detail, FIG. 14 illustrates the screen 1400 provided by the review provider 112 when a "MACARON ICE CREAM" button 1303 is selected among the hot keywords of FIG. 13.

Referring to the screen 1400 of FIG. 14, both of "Gyeongridangil" that is the location information and "MACARON ICE CREAM" that is a hot keyword are indicted in the upper end of the screen 1400. A map 1401 of "GYEONGRIDANGIL" is displayed thereunder, and pins indicating locations of POIs related to "MACARON ICE CREAM" are displayed on the map.

A list 1402 of POIs related to "MACARON ICE CREAM" is displayed under the map 1401, and review posts on each POI is listed under the POI.

A POI related to "MACARON ICE CREAM" may be a POI including a keyword of "MACARON ICE CREAM" in the name or detailed information of POIs stored in the map DB 300. Alternatively, the POI related to "MACARON ICE CREAM" may be a POI including a keyword of "MACARON ICE CREAM" in the title or main text of a review post written regarding the POI.

The method of providing user reviews according to an embodiment illustrated in FIGS. 3 and 4 can be written as computer programs and can be implemented in digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

As described above, in the apparatus, the method, and the computer program for providing user reviews according to the above-described embodiment, since reviews actually written by users are provided to a user, reviews having high reliability may be provided.

Furthermore, in the apparatus, the method, and the computer program for providing user reviews according to the above-described embodiments, since popularity of POIs are calculated based on the review actually written by users, accuracy and reliability of popularity are secured. Also, since a POI having high popularity is provided among POIs included in a particular area, user's needs to search for a POI having high popularity in a particular area is satisfied.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method, performed by a server computer, of providing user reviews of at least one point-of-interest (POI) located on a map to a user terminal through a communication network, the method comprising:

receiving, from a first user terminal, location information specifying an area on the map to obtain user reviews of POIs located in the specified area on the map; and classifying a plurality of review posts relating to the POIs located in the area on the map specified by the location information, the review posts being written by a plurality of users to include information about a the POIs included in the area on the map specified by the location information and posted on a personal webpage of the plurality of users; and providing the classified review posts to the first user terminal;

wherein before the receiving of the location information from the first user terminal, the method further comprises, receiving, from a second user terminal, a selection of any one of POIs stored in a map database (DB), providing the second user terminal with information about the selected POI, and receiving, from the second user terminal, identification information of a review post including the information about the selected POI and posted on a personal webpage of a second user; and storing the identification information of the review post in the map DB, linked with the selected POI, wherein, in the providing of the review posts to the first user terminal, the review posts correspond to review post identification information stored in the map DB linked with the POIs included in the area specified by the location information and posted on the personal webpage of the users.

2. The method of claim 1, wherein each of the review posts comprises any one piece of corresponding POI information set by a user that wrote the review post, among the plurality of POIs stored in the map DB.

3. The method of claim 2, wherein the POI information is a map indicating a location of a corresponding POI on the map.

4. The method of claim 1, wherein, in the providing of the review posts to the first user terminal, the plurality of POIs included in the specified area on the map are listed according to a preset standard, and a webpage in which review posts including each of the plurality of POIs are listed under each POI, is provided to the first user terminal.

5. The method of claim 4, wherein the plurality of POIs are listed in a first direction, and a review post including information about each of the plurality of POIs is listed in a second direction perpendicular to the first direction.

6. The method of claim 4, wherein the preset standard is that a POI is listed higher as the number of users writing review posts including information of the POI increases.

7. The method of claim 1, wherein the POIs included in the specified area of the map are included among the POIs stored in the map DB.

8. The method of claim 1, wherein the location information comprises a current location and a range of an area of coverage of the first user terminal, and the range is set to be a radius set by the first user terminal or a default radius.

9. The method of claim 1, wherein, in the providing of the review posts to the first user terminal, the number of POIs selected are as many as a preset number in an order of a largest number of review posts or a largest number of users writing review posts, among the POIs stored in the map DB and included in the area on the map, and review posts written to include information about any one of the selected POIs are classified according to each P01 and the classified review posts are provided to the first user terminal.

10. An apparatus for providing user reviews of at least one point-of-interest (POI) located on a map to a user terminal through a communication network, the apparatus comprising:

a review writing manager receiving, from a second user terminal in communication with the review writing manager, a selection of any one of points-of-interest (POIs) stored in a map database (DB), providing the second user terminal with information about a selected POI, receiving, from the second user terminal, identification information of a review post including the information about the selected POI and posted on a personal webpage of a second user, and storing the identification information of the review post in the map DB, linked with the selected POI; and a review provider receiving, from a first user terminal in communication with the review provider, location information specifying an area on the map to obtain user reviews of POIs located in the specified area on the map, classifying a plurality of review posts relating to the POIs located in the area on the map specified by the location information, the review posts corresponding to review post identification information stored in the map DB and linked with the POIs included in the area specified by the location information, and providing the classified review posts to the first user terminal.

11. A non-transitory computer readable storage medium having stored thereon a program, which when executed by a computer, performs the method defined in claim 1.

* * * * *